June 10, 1969     C. E. KNOWLES     3,449,016
BLOWER FOR PULVERULENT MATERIAL
Filed June 23, 1966     Sheet _1_ of 2
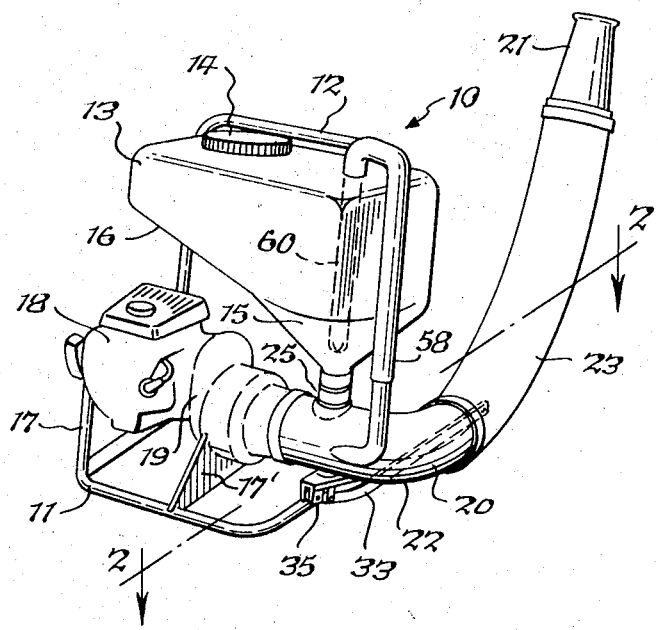
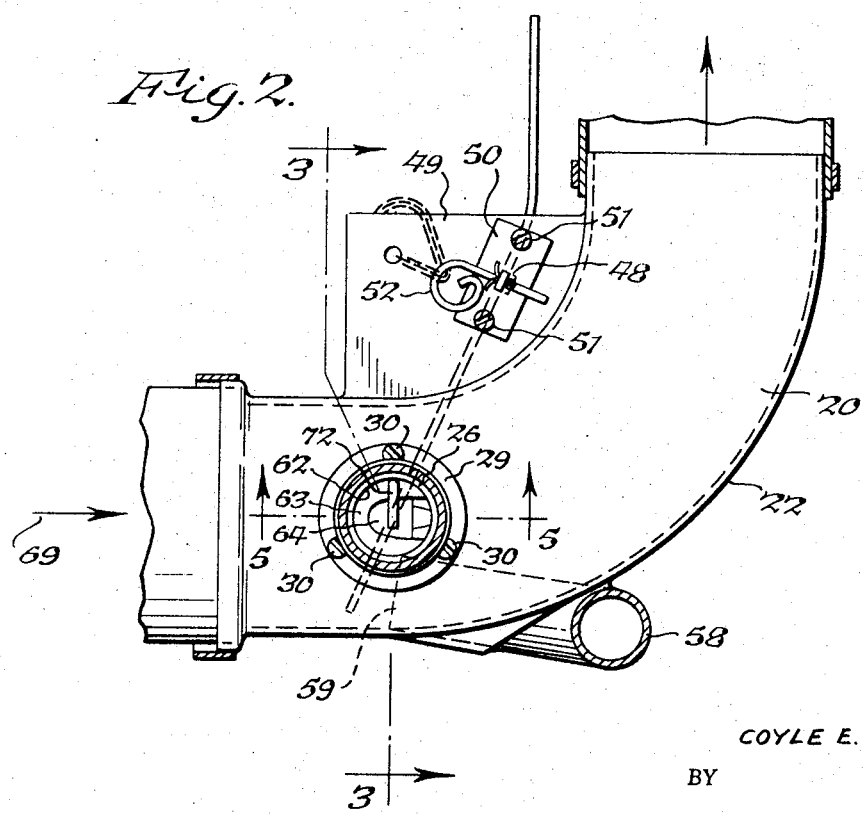
INVENTOR.
COYLE E. KNOWLES
BY
Bean, Brooks, Buckley & Bean
ATTORNEYS.

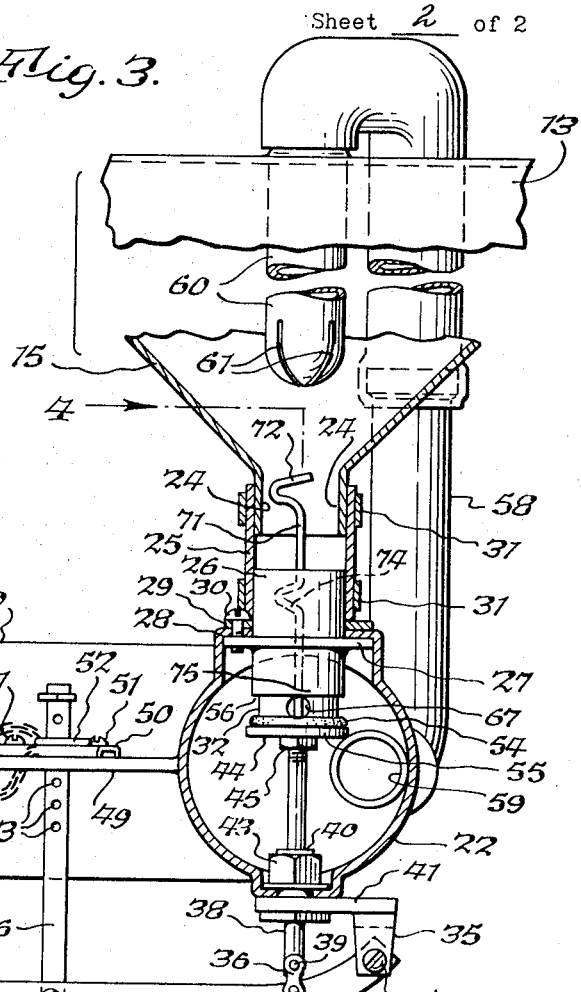
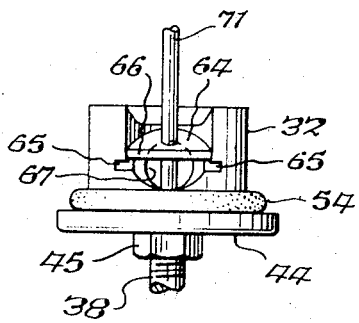
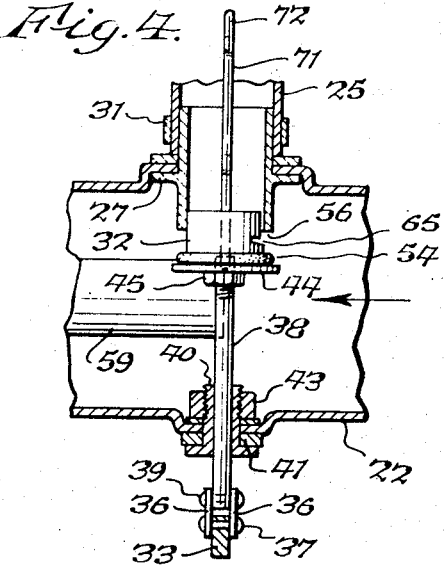
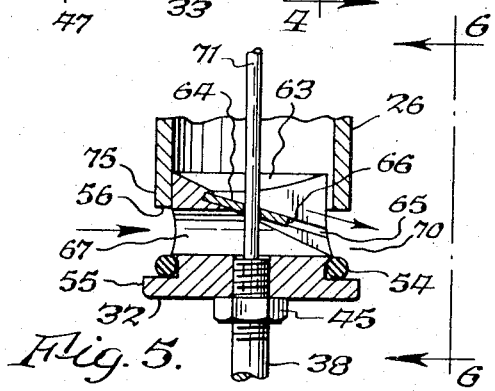

United States Patent Office 3,449,016
Patented June 10, 1969

3,449,016
BLOWER FOR PULVERULENT MATERIAL
Coyle E. Knowles, Gowanda, N.Y., assignor to Buffalo Turbine Agricultural Equipment Co., Inc., Gowanda, N.Y.
Filed June 23, 1966, Ser. No. 559,827
Int. Cl. B65g 53/40, 53/14
U.S. Cl. 302—36          22 Claims

ABSTRACT OF THE DISCLOSURE

A blower for pulverulent materal including a frame mounting a blower, a first conduit leading from the blower, a nozzle at the end of the conduit remote from the blower, a valve arrangement mounted on said first conduit for conducting pulverulent material into the gas stream in said first conduit, the valve arrangement including a housing, a valve body slidable with a linear reciprocating motion into and out of said housing, and a second conduit in said valve body in alignment with said first conduit for conducting air through said second conduit, a third conduit in said housing for conducting pulverulent material into the second conduit from a hopper, an inclined plate dividing the second conduit and the third conduit for preventing air from said second conduit entering into the housing, a fourth conduit in communication with the first conduit and with the hopper for producing flowing gas proximate the entry point of the pulverulent material into the valve housing, and linkage means for varying the amount that the valve body moves into the housing so as to vary the amount of air passing through the second conduit means and thereby vary the amount of pulverulent material which is deposited into the conduit means.

---

The present invention relates to an improved blower for dispensing pulverulent material and to an improved valve construction therefor.

It is one object of the present invention to provide an improved valve construction for a pulverulent material blower which permits relatively fine degrees of adjustment of the amount of pulverulent material which is entrained in a moving air stream. A related object of the present invention is to provide an improved valve construction which includes an agitator arrangement which both causes the pulverulent material to be supplied to the valve in a steady stream to thereby insure the desired rate of feed, and which, incidental to the opening and closing of the valve, serves to break up any accumulations of caked pulverulent material, thereby further insuring proper feed to the valve.

Another object of the present invention is to provide an improved pulverulent material blower which includes an arrangement for pneumatically pressurizing and agitating the pulverulent material leaving a hopper to thereby enhance its passage into a moving air stream. Other objects and attendant advantages of the present invention will readily be perceived herefter.

The improved pulverulent material blower construction of the present invention includes a hopper for pulverulent material, a source for producing moving air, a conduit for conducting the moving air to a nozzle, and a valve mounted at the junction of the hopper and the conduit, said valve including a valve housing, a valve body movable relative to said housing, first conduit means in said valve housing for receiving pulverulent material and conveying it toward said valve body, second conduit means extending through said valve body transversely to the direction of flow of said pulverulent material through said first conduit means, said second conduit means conducting a portion of said moving air, a seat on said valve body located above said second conduit mens for receiving said pulverulent material from said first conduit means, and baffle means on said valve body for permitting flow of said pulverulent material into said moving air flowing through said second conduit means without permitting said moving air to flow into said first conduit means in opposition to the flow of said pulverulent material. In addition, the improved blower includes an agitator stem mounted on the valve body which vibrates incidental to the flow of air through said second conduit means for breaking up any pulverulent material which tends to cake, thereby insuring proper feed of said pulverulent material into the air stream in which it is subsequently entrained. The valve housing includes a portion which may obstruct a part of the second conduit means in selectively variable amounts, to thereby vary the flow of pulverulent material. Also, a conduit is provided for conducting flowing air to the portion of the hopper proximate the point at which the pulverulent material enters the valve housing. This air not only pressurizes this area but also provides a certain amount of agitation to insure proper feeding. The improved pulverulent material blower construction of the present invention will be more fully understood when the following portions of the specification are read in conjunction with the accompanying drawings wherein:

FIGURE 1 is a perspective view of a pulverulent material blower made in accordance with the principles of the present invention;

FIGURE 2 is a cross sectional view taken substantially along line 2—2 of FIGURE 1;

FIGURE 3 is a cross sectional view taken substantially along line 3—3 of FIGURE 2;

FIGURE 4 is a cross sectional view taken substantially along line 4—4 of FIGURE 3;

FIGURE 5 is a cross sectional view through the valve taken substantially along line 5—5 of FIGURE 2; and FIGURE 6 is an end view of the outlet portion of the valve taken in the direction of the arrows on line 6—6.

In FIGURE 1 the improved blower 10 is shown which consists of a tubular frame 11 having an upstanding rear portion 12 mounting hopper 13. Pulverulent material such as insecticide dust or any other type of powder is poured into hopper 13 through the aperture (not shown) which is covered by removable cap 14. The lower portion of hopper 13 is formed into a funnel 15, which receives the pulverulent material from sloping bottom wall 16.

Also mounted on upstanding portion 17 of frame 11 and on bracket 17' is a small gasoline engine 18 which drives a fan or turbine blade (not shown) located within housing 19, which in turn is in communication with conduit 20 having an outlet nozzle 21 at its opposite end. Conduit 20 includes a rigid molded plastic portion 22 in the shape of an elbow and a corrugated flexible portion 23 mounted thereon, the flexibility permitting the nozzle to be pointed in any desired direction. Suitable straps (not shown) may be attached to portion 12 of frame 11 to permit the above-described blower 10 to be carried on the back of a person.

The pulverulent material to be blown is introduced into conduit portion 22 through neck 24 forming the lowermost portion of funnel 15. A sleeve 25 receives neck 24, and the lower portion of sleeve 25 mounts on the upper portion of valve housing 26. A flange 27 formed integrally with housing 26 (FIG. 3) is in abutting relationship with the underside of shelf 28 formed integrally with conduit 22. A washer 29 is located on top of shelf 28 and a plurality of screws 30 join flange 27 and washer 29 with shelf 28 sandwiched therebetween to thereby rigidly secure valve housing 26 to conduit 22. A pair of hose clamps 31 secure sleeve 25 to neck 24 and the upper portion of valve body 26.

A valve body 32 is mounted for vertical sliding movement within valve housing 26. The position of the valve body 32 relative to valve housing 26 determines the amount of pulverulent material which is released into the air stream flowing through conduit 22. In this respect it is the amount of air passing through conduit 67 in valve body 32 which determines the amount of pulverulent material which is deposited into the air stream in conduit 22. To vary this flow, valve body 32 may be raised or lowered so that the skirt portion 75 adjacent lip 56 (FIG. 5) obstructs varying amounts of conduit 67. Therefore, if only a small flow is desired, valve body 32 is moved up most of the way into valve housing 26 so that very little air passes through conduit 67. On the other hand, if a maximum flow is required, valve body 32 is moved to the position shown in FIGURE 3. If it is desired to terminate flow of pulverulent material completely without shutting off engine 18, it is merely necessary to move valve body 32 upwardly until such time as seal 54 is firmly sandwiched between collar 55 and lip 56.

In order to move valve body 32 vertically in FIGURE 3, a lever 33 is provided which has one end pivotally mounted on pin 34 extending between arms 35. Lost motion links 36 have first ends pivotally mounted to lever 33 at 37 and second ends pivotally mounted to rod 38 at 39. It can readily be seen that as lever 33 is pivoted about pin 34, rod 38 will move in a vertical direction as guided by bearing 40 located on bracket 41 which also mounts arms 35, bracket 41 being secured to conduit 22 by nut 43. The upper end of stem 38 is threaded into surface 44 of valve body 32 and locked relative thereto by nut 45.

In order to lock valve body 32 in any position to which it has been moved by lever 33, a locking arrangement is provided which consists of a link 46 having its lower end pivotally attached to lever 33 by pin 47 and its upper end extending through slots 48 in shelf 49 and plate 50, which is secured to shelf 49 by screws 51. A pin 52 is provided for placement in any of apertures 53 above plate 50 to thereby prevent lever 33 from pivoting in a counterclockwise direction in FIGURE 3 due to vibration of the apparatus when engine 18 is running.

Assuming that the valve body 32 occupies a position relative to valve housing 26, as shown in FIGURES 3, 4, 5 and 6, the following occurs to cause the pulverulent material within hopper 13 to be dropped into conduit 20 for entrainment with the air flowing therethrough. First of all, it is to be noted that a conduit 58 has a lower portion 59 located within conduit 22, with its open end facing the direction 69 (FIG. 2) from which the air is flowing. Thus air will enter portion 59 of conduit 58 and be carried through the latter to conduit 60 located within hopper 13. The lower end of conduit 60 has two crossing slits at the lower end thereof which is located within funnel 15 of hopper 13 and therefore also located near valve body 26. The air flowing through slits 61 will create a pressure on the pulverulent material in the immediate area and will also provide sufficient air movement to slightly agitate the pulverulent material, thereby insuring the flow of said pulverulent material toward valve body 26. The air flow also pressurizes hopper 13 thereby aiding in preventing flow of air from conduit 22 upwardly into funnel 15 through valve body 32.

The pulverulent material dropping through neck 24 of funnel 15 will enter the top aperture 62 (FIG. 5) of valve body 26 and drop down onto spherical seat 63 of valve body 32. This spherical seat acts as a funnel to cause the pulverulent material to drop onto inclined plate 64, the opposite edges of which are received in opposed slots 65 in valve body 32. Thereafter the pulverulent material moves downwardly and toward the right in FIGURE 5 and drops off of the lip 66 of inclined plate 64 where it is picked up by the air flowing through conduit 67 in valve body 32, this air originating at blower 19.

As can be seen, plate 64 reduces the cross sectional area of conduit 67 and the speed-up of air flowing through conduit 67 underneath lip 66 creates a vacuum which entrains the pulverulent material while the baffle 64 prevents this air from flowing upwardly into the housing 26. It is also to be noted that the air coming from the direction of arrow 69 in FIGURE 2 has to go around the valve housing 26 and the valve body 32. This air tends to come together at the area 70 (FIG. 5) of valve body 32 from which the pulverulent material is discharged. This creates a low pressure area which also causes the pulverulent material to be pulled into the main air stream passing through conduit 22.

An agitator rod 71 having its upper end formed as at 72 in FIGURE 3 and having an intermediate portion formed as at 74 in FIGURE 3 vibrates as a result of air passing through conduit 67 and this vibration tends to break up any lumps in the pulverulent material. In addition, as can be seen from FIGURE 5, the lower end of rod 71 is threaded into the upper end of rod or stem 38, and therefore rod 71 will move vertically with the valve body 32. Therefore, the up and down movement of valve body 32 will be accompanied by a corresponding movement of rod 71 and this will tend to break up any caked portions which may exist.

It can thus be seen that an improved pulverulent material blower has been provided which is manifestly capable of achieving the above enumerated objects and while preferred embodiments of the present invention have been disclosed, it is to be understood that it is not limited thereto but may be otherwise embodied within the scope of the following claims.

What is claimed is:

1. A pulverulent material blower construction comprising a valve housing, a valve body in said housing, first conduit means extending in a first direction and positioned relative to said valve housing for receiving pulverulent material and conveying it toward said valve body, second conduit means extending through said valve body in a second direction transverse to said first direction for conducting a moving gas, baffle means on said valve body effectively located at the juncture of said first and second conduit means for permitting flow of said pulverulent material into said moving gas flowing through said second conduit means while effectively preventing said moving gas from flowing into said first conduit means from said second conduit means, and third conduit means substantially in alignment with said second conduit means and in communication therewith for containing said valve body and for supplying said moving gas to said second conduit means and for conducting flowing gas around said valve body and causing said flowing gas to pick up pulverulent material emanating from said second conduit means.

2. A pulverulent material blower construction comprising a valve housing, a valve body in said housing, first conduit means extending in a first direction and positioned relative to said valve housing for receiving pulverulent material and conveying it toward said valve body, second conduit means extending through said valve body in a second direction transverse to said first direction for conducting a moving gas, baffle means on said valve body effectively located at the juncture of said first and second conduit means for permitting flow of said pulverulent material into said moving gas flowing through said second conduit means while effectively preventing said moving gas from flowing into said first conduit means from said second conduit means, a seat on said valve body for receiving said pulverulent material from said first conduit means, and wherein said baffle means comprises plate means mounted on said valve body and located between said seat and said second conduit means so that said pulverulent material falls on said plate means prior to falling into the gas passing through said second conduit means, said plate means being inclined downwardly in the direction of gas flow through said second conduit means to thereby guide said pulverulent material into said gas stream passing through said second conduit means.

3. A pulverulent material blower construction comprising a valve housing, a valve body in said housing, first conduit means extending in a first direction and positioned relative to said valve housing for receiving pulverulent material and conveying it toward said valve body, second conduit means extending through said valve body in a second direction transverse to said first direction for conducting a moving gas, baffle means on said valve body effectively located at the juncture of said first and second conduit means for permitting flow of said pulverulent material into said moving gas flowing through said second conduit means while effectively preventing said moving gas from flowing into said first conduit means from said second conduit means, means for effecting relative movement between said valve body and said valve housing, means for guiding said valve body relative to said housing while maintaining said transverse relationship between said first and second conduit means, and means for selectively closing off various portions of said second conduit means to thereby vary the flow of said gas therethrough and accordingly varying the rate at which said pulverulent material passes through said first conduit means.

4. A pulverulent material blower construction as set forth in claim 2 including third conduit means for conducting flowing gas proximate the location that said pulverulent material enters said first conduit means to thereby enhance flow of said pulverulent material through said first conduit means.

5. A pulverulent material blower construction as set forth in claim 3 including third conduit means for conducting flowing gas proximate the location that said pulverulent material enters said first conduit means to thereby enhance flow of said pulverulent material through said first conduit means.

6. A pulverulent material blower construction as set forth in claim 2 including means for effecting relative movement between said valve body and said valve housing, means for guiding said valve body relative to said housing while maintaining said transverse relationship between said first and second conduit means, and means for selectively closing off various portions of said second conduit means to thereby vary the flow of said gas therethrough and accordingly vary the rate at which said pulverulent material passes through said first conduit means.

7. A pulverulent material blower construction as set forth in claim 2 including an agitator rod mounted on said valve body and extending through said first conduit means for enhancing flow of pulverulent material therethrough.

8. A pulverulent material blower construction as set forth in claim 3 including an agitator rod mounted on said valve body and extending through said first conduit means for enhancing flow of pulverulent material therethrough.

9. A pulverulent material blower construction as set forth in claim 6 including an agitator rod mounted on said valve body and extending through said first conduit means for enhancing flow of pulverulent material therethrough.

10. A pulverulent material blower construction as set forth in claim 6 including third conduit means for conducting flowing gas proximate the location wherein said pulverulent material enters said first conduit means to thereby enhance flow of said pulverulent material through said first conduit means.

11. A pulverulent material blower construction as set forth in claim 7 including third conduit means for conducting flowing gas proximate the location where said pulverulent material enters said first conduit means, to thereby enhance flow of said pulverulent material through said first conduit means.

12. A pulverulent material blower construction as set forth in claim 11 including means for effecting relative movement between said valve body and said valve housing, means for selectively closing off various portions of said second conduit means to thereby vary the flow of said gas therethrough and accordingly vary the rate at which said pulverulent material passes through said first conduit means.

13. A pulverulent material blower construction as set forth in claim 12 including a hopper having a lower portion in communication with said valve housing, said lower portion being of a form to funnel said pulverulent material to said valve housing, and wherein said third conduit means conducts said gas to said lower portion of said hopper.

14. A pulverulent material blower construction as set forth in claim 13 including fourth conduit means for conducting flowing gas in which said pulverulent material is to be entrained, said valve housing being effectively mounted on said fourth conduit means and said valve body being located within said fourth conduit means with said second conduit means in said valve body being substantially in alignment with the direction of flow of said gas through said fourth conduit means.

15. A pulverulent material blower construction as set forth in claim 14 wherein said third conduit means is in communication with said fourth conduit means for conducting said gas from said fourth conduit means to said location proximate said first conduit means.

16. A pulverulent material blower construction as set forth in claim 15 wherein said fourth conduit means includes a source for producing a flowing gas at one end thereof to one side of said valve housing and nozzle means at the opposite end of said fourth conduit means to the opposite side of said valve housing for directing a mixture of pulverulent material entrained in said gas.

17. A pulverulent material blower construction as set forth in claim 16 including seal means mounted relative to said valve housing and said valve body for effecting a seal therebetween when said means for selectively closing off various portions of said second conduit means effectively completely closes off said second conduit means.

18. A pulverulent material blower construction comprising a valve housing, a valve body in said housing, first conduit means extending in a first direction and positioned relative to said valve housing for receiving pulverulent material and conveying it toward said valve body, second conduit means extending through said valve body in a second direction transverse to said first direction for conducting a moving gas, baffle means on said valve body effectively located at the juncture of said first and second conduit means for permitting flow of said pulverulent material into said moving gas flowing through said second conduit means while effectively preventing said moving gas from flowing into said first conduit means from said second conduit means, said valve housing comprising an elongated tubular member having an opening extending in a first direction and said valve body comprising an elongated member slidable in rectilinear telescoping relationship in said opening, said second conduit means extending in a direction transversely to said opening in said valve housing, a skirt portion on said housing for obstructing various amounts of said second conduit as said valve body slides relative to said housing to thereby vary the amount of gas flowing through said second conduit means, a valve seat on said body for catching pulverulent material, and said baffle means comprising a plate located below said valve seat and inclined downwardly in the direction of gas flow.

19. A pulverulent material blower construction as set forth in claim 18 including third conduit means substantially in alignment with said second conduit means and in communication therewith for containing said valve body and for supplying said moving gas to said second conduit means and for conducting flowing gas around said valve body and causing said flowing gas to pick up pulverulent material emanating from said second conduit means.

20. A pulverulent material blower construction as set forth in claim 19 including an agitator rod mounted on said plate and extending into said first conduit means.

21. A pulverulent material blower construction as set forth in claim 20 including a collar on said valve body, and a seal mounted on said collar, said collar and said skirt clamping said seal therebetween on full movement of said valve body into said housing.

22. A pulverulent material blower construction as set forth in claim 19 including a source for producing flowing gas in communication with one end of said third conduit means, and nozzle means at the opposite end of said third conduit means on the opposite side of said valve housing for directing a mixture of pulverulent material entrained in said gas.

References Cited

UNITED STATES PATENTS

| | | | |
|---|---|---|---|
| 714,802 | 12/1902 | Kiser | 222—193 |
| 727,030 | 5/1903 | Tilghman | 302—42 X |
| 793,526 | 6/1905 | Johnson | 222—193 |
| 847,270 | 3/1907 | Wise | 302—57 |
| 1,558,362 | 10/1925 | Hull | 222—193 |
| 2,330,164 | 9/1943 | Wiedehoefer | 222—193 X |

FOREIGN PATENTS 720,529    12/1954    Great Britain.

ROBERT B. REEVES, *Primary Examiner.*

F. R. HANDREN, *Assistant Examiner.*

U.S. Cl. X.R.

137—205.5, 268, 604; 222—193